US006824820B1

(12) United States Patent
Kinning et al.

(10) Patent No.: US 6,824,820 B1
(45) Date of Patent: Nov. 30, 2004

(54) POLYUREA-BASED ADHESIVES, ARTICLES THEREFROM AND METHODS OF THEIR PREPARATION AND USE

(75) Inventors: David J. Kinning, Woodbury, MN (US); Charles M. Leir, Falcon Heights, MN (US); Audrey A. Sherman, St. Paul, MN (US); Meherdil D. Dastur, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/355,601

(22) PCT Filed: Jun. 7, 1999

(86) PCT No.: PCT/US99/12687

§ 371 (c)(1), (2), (4) Date: Jul. 30, 1999

(87) PCT Pub. No.: WO00/75210

PCT Pub. Date: Dec. 14, 2000

(51) Int. Cl.$^7$ .............................. B05D 5/10; B32B 7/12; C08L 75/00
(52) U.S. Cl. ................................ 427/208.4; 427/208.6; 427/208.8; 524/270; 524/505; 524/589; 428/343; 428/349
(58) Field of Search .................................. 524/270, 505, 524/589; 528/28, 61; 427/208.4, 208.6, 208.8; 428/343, 349

(56) References Cited

U.S. PATENT DOCUMENTS

| | | | |
|---|---|---|---|
| 3,437,622 A | 4/1969 | Dahl | |
| 3,595,732 A | 7/1971 | Tingerthal | |
| 3,718,712 A | 2/1973 | Tashaus | |
| 3,752,700 A | 8/1973 | Dahl | |
| 3,761,307 A | 9/1973 | Dahl | |
| 3,767,040 A | 10/1973 | Tashaus | |
| 3,796,678 A | * 3/1974 | Bartizol | |
| 3,802,988 A | 4/1974 | Dahl | |
| 3,896,789 A | * 7/1975 | Trancik | |
| 3,925,283 A | 12/1975 | Dahl | |
| 3,957,724 A | 5/1976 | Schurb et al. | |
| 4,493,714 A | 1/1985 | Ueda et al. | |
| 4,803,257 A | 2/1989 | Goel | |
| 4,849,458 A | 7/1989 | Reed et al. | |
| 5,047,272 A | * 9/1991 | Hassel et al. | |
| 5,049,427 A | * 9/1991 | Starzewski et al. | |
| 5,109,096 A | 4/1992 | Hess et al. | |
| 5,120,813 A | 6/1992 | Ward, Jr. | |
| 5,176,956 A | 1/1993 | Jevne et al. | |
| 5,214,119 A | 5/1993 | Leir et al. | |
| 5,221,724 A | 6/1993 | Li et al. | |
| 5,356,706 A | 10/1994 | Shores | |
| 5,461,134 A | 10/1995 | Leir et al. | |
| 5,543,171 A | 8/1996 | Shores | |
| 5,591,820 A | 1/1997 | Kydonieus et al. | |
| 5,653,699 A | 8/1997 | Reed et al. | |
| 5,824,748 A | * 10/1998 | Kesti et al. | |
| 5,866,222 A | 2/1999 | Seth et al. | |
| 6,224,949 B1 | * 5/2001 | Wright et al. | |

FOREIGN PATENT DOCUMENTS

| | | |
|---|---|---|
| DE | 2210594 | 9/1973 |
| DE | 3730780 | 3/1989 |
| EP | 0 250 248 | 12/1987 |
| EP | 0 342 826 | 11/1989 |
| EP | 0 380 236 | 8/1990 |
| EP | 0 440 934 A2 | 8/1991 |
| EP | 0 606 532 | 7/1994 |
| FR | 2699833 | 7/1994 |
| GB | 1128642 | 5/1966 |
| JP | 51-12828 | 1/1976 |

(List continued on next page.)

OTHER PUBLICATIONS

The Structure and Properties of Pressure–Sensitive Polyurethane Adhesives, V.V. Shevchenko, N.S. Klimenko, E.G. Privalko, and V.N. Bliznyuk, Polymer Science, pp. 1117–1122, Series A, vol. 38, No. 10, 1996.

(List continued on next page.)

Primary Examiner—Tae H. Yoon
(74) Attorney, Agent, or Firm—Lisa P. Fulton

(57) ABSTRACT

An adhesive composition comprising
a silicone free polyurea-based polymer, comprising a segmented copolymer, wherein the copolymer comprises repeating units of Formula I:

(I)

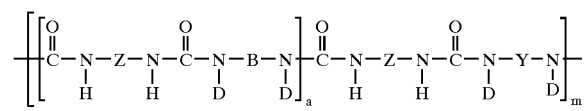

wherein:
each B is independently a polyvalent radical selected form a group consisting of arylene, aralkylene, cycloalkylene, polyoxyalkylene, or mixtures thereof;
each D is independently selected from the group consisting of hydrogen, an alkyl group, a cycloalkyl group, a phenyl group, a group that completes a ring structure that includes B to form a heterocycle, and mixtures thereof;
each Z is independently a polyvalent radical having about 1 to about 20 carbon atoms;
each Y is independently a polyoxyalkylene;
m is an integer greater than zero; and
a is zero or an integer greater than zero; and
wherein the composition comprises a tackifier in an amount sufficient to provide the adhesive composition as a pressure sensitive adhesive and in an amount less than about 45 parts by weight tackifier per hundred part by weight polyurea-based polymer.

21 Claims, No Drawings

FOREIGN PATENT DOCUMENTS

| | | |
|---|---|---|
| JP | 62-297375 | 12/1987 |
| JP | 2-70781 | 3/1990 |
| JP | 2-70785 | 3/1990 |
| JP | 4-372683 | 12/1992 |
| JP | 7-102233 | 4/1995 |
| WO | WO 95/03354 | 2/1995 |
| WO | WO 95/21206 | 8/1995 |
| WO | WO 96/34028 | 10/1996 |
| WO | WO 96/35458 | 11/1996 |
| WO | WO 98/13135 | 4/1998 |
| WO | WO 98/31760 | 7/1998 |

OTHER PUBLICATIONS

"Study About Effect of Urea and Urethane Linkages of Phase Separation of Segmented Polyurethanes and Polyureas," *Gaofenzi Cailiao Kexue Yu Gongcheng*, Chen Zhusheng, Polymeric Materials Science and Engineering, pp. 66–71, vol. 6(5), Sep. 1990 (English Abstract attached).

"The Study of Polyurethanes and Polyureas by Transmission Spectra of Fourie Transform Infrared Spectroscopy," *Gaofenzi Cailiao Kexue Yu Gongcheng*, Chen Zhusheng, Yang WP and Macosko CW, Polymeric Materials Science and Engineering, pp. 58–62, vol. 9(3), May 1993 (English Abstract attached).

"Foam Kinetics," L.D. Artavia and C.W. Macosko, $33^{rd}$ Annual Polyurethane Technical/Marketing Conference, pp. 554–561, 1990.

Block Copolymers, Allport & Mohajer, D.C. Allport and W.H. Janes Ed., pp. 443–492, 1973.

* cited by examiner

POLYUREA-BASED ADHESIVES, ARTICLES THEREFROM AND METHODS OF THEIR PREPARATION AND USE

FIELD OF THE INVENTION

The present invention relates generally to the field of adhesives, specifically to the field of pressure-sensitive-adhesives and heat-activatable adhesives that are polyurea-based.

BACKGROUND OF THE INVENTION

Adhesives have been used for a variety of marking, holding, protecting, sealing and masking purposes. Adhesive tapes generally comprise a backing, or substrate, and an adhesive. One type of adhesive, a pressure-sensitive-adhesive (PSA) is particularly preferred for many applications.

PSAs are well known to one of ordinary skill in the art to possess certain properties at room temperature including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear strength. The most commonly used polymers for preparation of PSAs are natural rubber, synthetic rubbers (e.g., styrene/butadiene copolymers (SBR) and styrene/isoprene/styrene (SIS) block copolymers), and various (meth)acrylate (e.g., acrylate and methacrylate) copolymers. With the exception of several (meth)acrylates, which are inherently tacky, these polymers are typically blended with appropriate tackifying resins to render them pressure-sensitive.

One disadvantage of (meth)acrylates, however, is that (meth)acrylates often contain residual (i.e., unreacted) monomers and other low molecular weight impurities in the final adhesive compositions. Residual monomers and low molecular weight impurities may be problematic in certain applications, such as medical and electronic applications. In medical and electronic applications, residual monomers and impurities may cause, for example, undesirable odor or potential contamination of substrates/articles (e.g., hard disk drives) in which they are in contact.

Much less frequently described are PSAs based on polyurethane-based polymers, such as the polyether/polyurethane polymers described by Allport and Mohajer in *Block Copolymers*, D. C. Allport and W. H. Janes Ed., (1973) pp. 443–92. Also see U.S. Pat. Nos. 3,718,712 (Tushaus) and 3,767,040 (Tushaus). It has been difficult to obtain balanced viscoelastic properties when using polyurethane-based polymers, however, which may explain their infrequent use when preparing PSAs. For example, U.S. Pat. No. 5,591,820 (Kydonieus et al.) indicates that existing polyurethane-based adhesives function either as weak elastics or high viscosity liquids. The former, weak elastics, tend to fail gradually by peeling away from surfaces to which they have been applied. The latter, high viscosity liquids, typically leave a residue upon removal from a surface and their cohesive strength is too low to withstand stresses applied in many applications.

Polyurethane-based polymers are typically prepared by reacting an isocyanate-functional material with a hydroxy-functional material. Some examples of polyurethane-based polymers used for formulating PSAs include those described in U.S. Pat. No. 3,437,622 (Dahl). Polyurethane-based polymers are not always desirable, however, because they typically require either a catalyst or external heat source to form the urethane linkages. For example, see U.S. Pat. No. 5,591,820 (Kydonieus et al.).

Furthermore, many polyurethane-based polymers must be crosslinked to have adequate cohesive strength as PSAs. There are two general methods used to crosslink polyurethane-based polymers. One method is chemical crosslinking through the formation of covalent bonds. However, the degree of chemical crosslinking must be carefully controlled so that the moduli of the resulting material is not increased to the extent that peel adhesion and tack are adversely affected. Furthermore, premature gellation of the adhesive and limited pot life of the PSA may also be problematic when using chemical crosslinking to bolster the cohesive strength of a PSA.

A common chemical crosslinking method described in the literature is the use of multivalent components to achieve a crosslinked network in the adhesive composition. For example, the crosslinked network may be formed by incorporating urethane or urea linkages between polyurethane polymer chains. Urea linkages are typically incorporated into the material by, for example, using a polyamine. For example, see JP-07-102,233 (Sekisui Chemical) and JP62-297,375 (Kao Corp.). Some of the resulting materials purportedly have PSA properties, either in a partially cured state or in the final composition.

For example, U.S. Pat. No. 4,803,257 (Goel) describes a polyurethane adhesive (i.e., having structural or semi-structural properties) comprising a mixture of a polyisocyanate blocked with a phenolic agent and a polyamine curing agent. The composition may optionally include a polyepoxide. In the partially cured state, this composition is said to exhibit properties similar to those of PSAs. The compositions cure at room temperature to reach the full strength of a structural adhesive.

Also, U.S. Pat. Nos. 3,437,622 and 3,761,307 (Dahl) describe preparation of polyurethane polymers suitable for making PSAs, and which can be crosslinked with certain amines. Suitable amines are taught to be aromatic diamines or polyamines with the amino groups sterically or otherwise hindered by negative groups (Cl, Br, I, OH, etc). These negative groups decrease the reactivity of neighboring amino groups. When crosslinked, it is required that the amino groups be unreactive enough so that polyols and isocyanates can react to form polyurethane polymers before the isocyanates extensively react with the amino groups.

A second method of crosslinking polyurethane-based polymers is physical crosslinking. Physical crosslinking such polymers typically involves incorporation of urea segments in the polyurethane-based polymeric chain using, for example, an amine chain extender. However, polyurea-based polymers are even less likely candidates for formulation into PSAs because polyureas have even higher moduli than the corresponding polyurethanes due to the chemical nature of the urea groups in polyureas. Accordingly, polyureas tend to be more elastic and adhesives prepared therefrom may not have adequate peel adhesion and tack, properties that may be desired for certain applications. For example, see Chen, Z. et al., "The Study of Polyurethanes and Polyureas by Transmission Spectra of Fourier Transform Infrared Spectroscopy," *Gaofenzi Cailiao Kexue Yu Gongcheng* 1993, 9(3), pp. 58–62 and Chen, Z, "Study About Effect of Urea and Urethane Linkages on Phase Separation of Segmented Polyurethanes and Polyureas," *Gaofenzi Cailiao Kexue Yu Gongcheng* 1990, 6(5), pp. 66–71. The higher moduli of polyureas present a problem when trying to formulate the polyureas into PSAs, particularly PSAs having adequate peel adhesion for many applications. Perhaps because of this apparent difficulty, there are very few descriptions of PSAs that are polyurea-based. Accordingly, polyurea-based polymers, particularly silicone polyurea-based polymers are typically used for release materials, such as those described in U.S. Pat. No. 5,866,222 (Seth et al.).

Polyurea-based polymers provide an alternative to polyurethane-based polymers. Polyureas are preparable by reacting an isocyanate-functional material with an amine-functional material. Advantageously, polyurea-based polymers typically do not require a catalyst or an external heat source for their preparation.

Among the few descriptions of polyurea-based PSAs, organosiloxane-polyurea block copolymers useful as PSAs are described by Leir et al. (EP Patent Publication No. 0 250 248 A2). The organosiloxane-polyurea block copolymers described therein are prepared by the condensation polymerization of a difunctional organopolysiloxane amine with a diisocyanate. The reaction may include an optional difunctional amine chain extender. These copolymers are stated to be useful, when tackified, as PSA compositions.

Leir et al., however, require the preparation of unique diaminopolysiloxanes. Leir et al. also teach that an approximately equal weight of the silicone tackifier resin with respect to the organosiloxane-polyurea block copolymer is used to make PSAs therein. The use of such highly tackified compositions may not be desirable, however, because tackifiers typically include a relatively high amount of low molecular weight impurities, which may be problematic in certain applications. Furthermore, certain such tackifiers generally tend to be relatively expensive.

Another drawback of using polyurethane-based polymers for the formulation of PSAs is the difficulty often experienced in finding suitable tackifiers for the polymers. For example, U.S. Pat. No. 3,767,040 (Tushaus) teaches the use of certain unique tackifiers synthesized from cyclic terpene alcohols and aromatic isocyanates to provide polyurethane-based PSAs. Tushaus teaches, however, that the tackifiers therein were not found to be effective with natural rubber or styrene-butadiene rubbers or polyurethane polymers other than those specifically described therein to provide PSAs.

Other adhesive chemistries, particularly PSA chemistries, are desirable, particularly for broadening formulation latitude when preparing such adhesives. Furthermore, due to the advantages that polyureas provide over, for example, polyurethanes, it would be desirable to broaden preexisting PSA chemistries to include further polyurea-based chemistries, particularly those that do not require such high tackification as those PSAs discussed by Leir et al. and those that do not contain such a large proportion of silicone in the polymers used to prepare the PSAs.

SUMMARY OF THE INVENTION

Adhesive compositions of the invention offer broad formulation latitude to those preparing pressure-sensitive and heat-activatable adhesives. The adhesive compositions also benefit from the advantages of being prepared from polyurea-based polymers. For example, many of PSA compositions of the invention do not require as high of a level of tackification as typically required when preparing conventional PSAs.

In one embodiment, adhesive compositions of the invention comprise a polyurea-based polymer, wherein the polyurea-based polymer does not require greater than about 45 parts by weight tackifier per hundred parts by weight polyurea-based polymer to exhibit a peel adhesion of greater than about 10.0 N/dm when tested according to ASTM D 3330-90, wherein ASTM D 3330-90 is modified by substituting a glass substrate for a stainless steel substrate. More preferably, the composition exhibits a peel adhesion of greater than about 20.0 N/dm when tested according to ASTM D 3330-90, wherein ASTM D 3330-90 is modified by substituting a glass substrate for a stainless steel substrate.

It may also be desirable to formulate the adhesive such that it exhibits a certain shear strength. In one embodiment, the composition exhibits a shear strength of greater than about one minute when tested according to ASTM D 3654-88. In more particular embodiments, the composition exhibits a shear strength of greater than about 10 minutes when tested according to ASTM D 3654-88. More particularly, the composition may exhibit a shear strength of greater than about 100 minutes when tested according to ASTM D 3654-88.

The composition may comprise a variety of additives. For example, the composition may further comprise an acid-containing polymeric material.

The composition may also further comprise a tackifier. The tackifier may be present in an amount of up to about 45 parts by weight tackifier per hundred parts by weight polyurea-based polymer. Alternatively, however, the tackifier may be present in an amount of greater than about 45 parts by weight tackifier per hundred parts by weight polyurea-based polymer.

In one specific embodiment, the polyurea-based copolymer comprises a segmented copolymer, which copolymer comprises repeating units of Formula I:

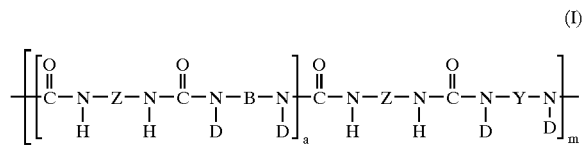

wherein:
  each B is independently a polyvalent radical (e.g., B is a polyoxyalkylene);
  each D is independently selected from the group consisting of hydrogen, an alkyl group, a cycloalkyl group, a phenyl group, a group that completes a ring structure that includes B to form a heterocycle, and mixtures thereof;
  each Z is independently a polyvalent radical;
  each Y is independently a polyoxyalkylene (e.g., Y is selected from the group consisting of polyethylene oxide, polypropylene oxide, and polytetramethylene oxide);
  m is an integer greater than zero; and
  a is zero or an integer greater than zero.

In another specific embodiment, the polyurea-based polymer comprises a segmented copolymer, wherein at least about 0.5 mole fraction of linkages between segments in a backbone of the polymer are urea linkages. More preferably, the polymer comprises a segmented copolymer, wherein at least about 0.75 mole fraction of linkages between segments in a backbone of the polymer are urea linkages. Even more preferably, the polyurea-based polymer comprises a segmented copolymer, wherein at least about 0.95 mole fraction of linkages between segments in a backbone of the polymer are urea linkages.

In another specific embodiment, the polyurea-based polymer comprises less than about 75 weight % polysiloxane segments based on total weight of the polyurea-based polymer. More preferably, the polyurea-based polymer comprises less than about 50 weight % polysiloxane segments based on total weight of the polyurea-based polymer.

The adhesive composition may be a pressure-sensitive adhesive or heat-activatable adhesive, depending on the particular formulation. One particular embodiment of a heat-activatable adhesive composition comprises: a polyurea-based polymer; and optionally, at least one tackifier, wherein the composition exhibits a peel adhesion of greater than about 10.0 N/dm when tested according to ASTM D 3330-90, wherein ASTM D 333090 is modified by substituting a glass substrate for a stainless steel substrate and adding a step of using sufficient heat to bond the heat-activatable composition to the glass substrate.

One preferred embodiment of the adhesive composition comprises: a polyurea-based polymer; and optionally, at least one tackifier, wherein the polyurea-based polymer comprises less than about 75 weight % polysiloxane segments based on total weight of the polyurea-based polymer and wherein the adhesive composition is one of a pressure-sensitive adhesive composition and a heat-activatable adhesive composition. Particularly useful adhesive compositions are those where the adhesive composition is a pressure-sensitive adhesive composition.

Another preferred embodiment of the adhesive composition comprises: a polyurea-based polymer; and optionally, at least one tackifier, wherein the polyurea-based copolymer comprises a segmented copolymer, which copolymer comprises repeating units of Formula I:

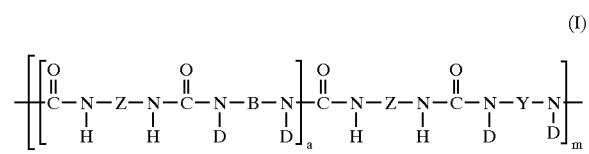

wherein:
each B is independently a polyvalent radical;
each D is independently selected from the group consisting of hydrogen, an alkyl group, a cycloalkyl group, a phenyl group, a group that completes a ring structure that includes B to form a heterocycle, and mixtures thereof;
each Z is independently a polyvalent radical;
each Y is independently a polyoxyalkylene;
m is an integer greater than zero; and
a is an integer greater than or equal to zero, and
wherein the adhesive composition is one of a pressure-sensitive adhesive composition and a heat-activatable adhesive composition. Particularly useful adhesive compositions are those where the adhesive composition is a pressure-sensitive adhesive composition.

Adhesive compositions of the invention may be used in a variety of applications. For example, the adhesive compositions may be used in adhesive tapes that comprise a backing and the adhesive composition coated on at least a portion thereof. It may be preferred to use a polyurea backing for such adhesive tapes. Adhesive tapes may also further comprise a release material coated on at least a portion of the backing, on a side of the backing opposite of the adhesive.

A method of preparing adhesive compositions of the invention comprises the steps of:
providing at least one polyisocyanate;
providing at least one polyamine;
reacting the at least one polyisocyanate with the at least polyamine to form the polyurea-based polymer; and
optionally adding the tackifier to the polyurea-based polymer.

The method may further comprise the step of hot-melt coating the adhesive composition onto a substrate. This may be particularly useful when the at least one polyisocyanate and the at least one polyamine are reacted by reactive extrusion. Alternatively, the method may further comprise the step of solvent coating the adhesive composition onto a substrate. In the method of the invention, the polyurea-based polymer may be polymerized on-web.

DETAILED DESCRIPTION OF THE PREFERRED EMBODIMENTS

As summarized, adhesives of the invention are polyurea-based. The adhesives can be formulated into pressure-sensitive-adhesives or heat-activatable adhesives.

"Pressure-Sensitive-Adhesives" (PSAs) of the invention have the following properties at room temperature: (1) aggressive and permanent tack, (2) adherence with no more than finger pressure, (3) sufficient ability to hold onto an adherend, and (4) sufficient cohesive strength to be removed cleanly from the adherend. Wide ranges of PSA properties are obtainable with compositions of the invention.

"Heat-activatable adhesives" are substantially nontacky at room temperature, but become tacky upon heating. Heat-activatable systems, unlike PSA systems, rely on a combination of pressure and/or heat to bond to a surface.

In certain embodiments, adhesives of the invention have excellent peel adhesion after bonding, preferably exhibit a 180° peel adhesion of greater than about 1.0 N/dm, more preferably greater than about 10.0 N/dm, most preferably greater than about 20.0 N/dm when tested according to ASTM D 3330-90, substituting a glass substrate for the stainless steel substrate described in the test. If the composition is a heat-activatable adhesive, ASTM D 3330-90 is also modified by adding a step of using sufficient heat to bond the heat-activatable adhesive composition to the glass substrate at the desired peel adhesion value.

In certain embodiments, adhesives of the invention preferably exhibit a shear strength after bonding of greater than about one minute, more preferably greater than about 10 minutes, most preferably greater than about 100 minutes when tested according to ASTM D 3654-88. If the composition is a heat-activatable adhesive, ASTM D 3654-88 is also modified by adding a step of using sufficient heat to bond the heat-activatable adhesive composition to the stainless steel substrate at the desired peel adhesion value.

Advantageously, adhesives of the invention provide an alternative to conventional adhesive chemistries. The adhesives are polyurea-based, which provides many advantages. For example, the physical force of attraction between urea groups on adjacent polymer chains provides increased cohesive strength to adhesives in which they are used. Thus, advantageously, chemical crosslinking of the polymer is not required. Furthermore, as compared to, for example, polyurethane-based polymers, preparation of the polyurea-based polymers used in adhesives of the invention is relatively simple in that it does not require catalysts or an external heat source for polymerization of the polyurea-based polymers.

In general, polyurea-based polymers of the invention are segmented copolymers comprising a substantial proportion of urea linkages in the backbone of the polymer. However, those polyurea-based polymers comprising segmented copolymers wherein at least about 0.5 mole fraction (i.e., fraction of the total molar units of linkages between segments in the backbone of the polymer) of the linkages between segments in the backbone of the polymer are urea linkages are considered preferred polyurea-based polymers of the invention. More preferably, at least about 0.75 mole fraction, and even more preferably at least about 0.95 mole fraction of the linkages between segments in the backbone of the polymer are urea linkages. Most preferably, the linkages between segments in the backbone of the copolymers are essentially all urea linkages. The remainder of the linkages can be any suitable chemistry, such as, for example, urethane linkages. Again, however, it is preferred that substantially all of the linkages between segments in the backbone of the copolymers are urea linkages.

Preferred polyurea-based polymers of the invention are segmented copolymers generally represented by the repeating unit of Formula I:

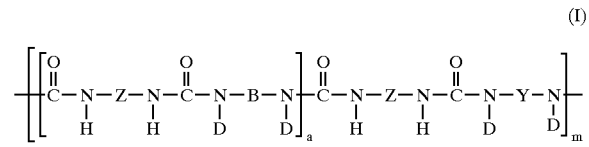

(I)

wherein:

Each B is independently a polyvalent radical. For example, B can be an arylene (e.g., phenylene), aralkylene, alkylene, cycloalkylene, polysiloxane (e.g., polydimethyl siloxane), polyoxyalkylene (e.g., polyoxyethylene, polyoxypropylene, and polyoxytetramethylene), or mixtures thereof. Most preferably, however, B is essentially free of siloxane units.

Each D is independently selected from the group consisting of hydrogen, an alkyl group, a cycloalkyl group, a phenyl group, a group that completes a ring structure that includes B to form a heterocycle, and mixtures thereof. Preferably, if D is an alkyl group, the alkyl group is about 1 to about 18 carbon atoms, more preferably about 1 to about 12 carbon atoms, and most preferably about 1 to about 10 carbon atoms.

Each Y is independently a polyoxyalkylene (e.g., polyoxyethylene, polyoxypropylene, polyoxytetramethylene, or mixtures thereof).

Each Z is independently a polyvalent radical, which may be polymeric or oligomeric. Z can be based on arylene (e.g., phenylene), aralkylene, alkylene, cycloalkylene, polysiloxane (e.g., polydimethyl siloxane), or polyoxyalkylene (e.g., polyoxyethylene, polyoxypropylene, and polyoxytetamethylene) segments and mixtures thereof. Also, preferably Z has about 1 to about 20 carbon atoms, and more preferably about 6 to about 20 carbon atoms. For example, Z can be selected from 2,6-tolylene; 4,4'-methylenediphenylene; 3,3'-dimethoxy-4,4'-biphenylene; tetramethyl-m-xylylene; 4,4'-methylenedicyclohexylene; 3,5,5-trimethyl-3-methylenecyclohexylene; 1,6-hexamethylene; 1,4-cyclohexylene; 2,2,4-trimethylhexylene; or polymeric or oligomeric alkylene, aralkylene, or oxyalkylene radicals and mixtures thereof. When Z is a polymeric or oligomeric material it may include, for example, urethane linkages.

The letter "a" is zero or an integer greater than zero.

The letter "m" is an integer greater than zero, preferably greater than about 10.

The polyurea-based polymers are derivable by reacting at least one polyamine with at least one polyisocyanate. These reactants are described in further detail below.

Polyisocyanate

Polyisocyanates provide urea linkages when reacted with an amine-functional material. Polyisocyanates have at least two isocyanate functional groups. Generally, diisocyanates are used in the present invention. However, polyisocyanates having three or more isocyanate functional groups can be used, particularly when crosslinking of the polyurea-based polymer is desired.

Preferred diisocyanates useful in the process of the present invention are represented by Formula II:

(II)

wherein Z is as defined above.

However, any diisocyanate that can react with a polyamine can be used in the present invention. Examples of such diisocyanates include, but are not limited to, aromatic diisocyanates (e.g., 2,6-toluene diisocyanate; 2,5-toluene diisocyanate; 2,4-toluene diisocyanate; m-phenylene diisocyanate; p-phenylene diisocyanate; methylene bis(o-chlorophenyl diisocyanate); methylenediphenylene-4,4'-diisocyanate; polycarbodiimide-modified methylenediphenylene diisocyanate; (4,4'-diisocyanato-3,3', 5,5'-tetraethyl) diphenylmethane; 4,4'-diisocyanato-3,3'-dimethoxybiphenyl (o-dianisidine diisocyanate); 5-chloro-2,4-toluene diisocyanate; and 1-chloromethyl-2,4-diisocyanato benzene), aromatic-aliphatic diisocyanates (e.g., m-xylylene diisocyanate and tetramethyl-m-xylylene diisocyanate), aliphatic diisocyanates (e.g., 1,4-diisocyanatobutane; 1,6-diisocyanatohexane; 1,12-diisocyanatododecane; and 2-methyl-1,5-diisocyanatopentane), and cycloaliphatic diisocyanates (e.g., methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), and other compounds (e.g., alkyl, polyoxyalkyl, polyester, polybutadienyl, and the like) terminated by two isocyanate functional groups (e.g., the diurethane of toluene-2,4-diisocyanate-terminated polypropylene oxide glycol).

Particularly preferred diisocyanates include: 2,6-toluene diisocyanate; methylenediphenylene-4,4'-diisocyanate; polycarbodimide-modified methylenediphenyl diisocyanate; 4,4'-diisocyanato-3,3'-dimethoxybiphenyl(o-dianisidine diisocyanate); tetramethyl-m-xylylene diisocyanate; methylenedicyclohexylene-4,4'-diisocyanate; 3-isocyanatomethyl-3,5,5-trimethylcyclohexyl isocyanate (isophorone diisocyanate); 1,6-diisocyanatohexane; 2,2,4-trimethylhexyl diisocyanate; and cyclohexylene-1,4-diisocyanate. More particularly preferred are tetramethyl-m-xylylene diisocyanate, 3-isocyanatomethyl-3,5,5-trimethylcyclohexyl isocyanate (isophorone diisocyanate), and methylenedicyclohexylene-4, 4'-diisocyanate.

Triisocyanates include, but are not limited to, polyfunctional isocyanates, such as those produced from biurets, isocyanurates, adducts and the like. Some commercially available polyisocyanates include portions of the DESMODUR and MONDUR series from Bayer; Pittsburgh, Pa. and the PAPI series of Dow Plastics; Midland, Mich. Preferred triisocyanates include those available from Bayer under the trade designations DESMODUR N-3300 and MONDUR 489.

Polyamine

Any suitable compound having at least two amine functional groups can be used for the polyamine in the present invention. For example, the compound may be a diamine, triamine, etc. Examples of polyamines useful in the present invention include, but are not limited to, polyoxyalkylene polyamines, alkylene polyamines, and polysiloxane polyamines. Mixtures of polyamines may also be used for the polyamine component.

For example, in one embodiment, the polyamine component comprises a mixture of a polyoxyalkylene polyamine and a polysiloxane polyamine. However, if used, the polysiloxane polyamine may be difficult to copolymerize with the other reactants due to the generally lower compatibility of polysiloxanes with many reactants. Furthermore, it may be difficult to obtain desired viscoelastic properties necessary for a PSA. Thus, polyurea-based polymers of the invention preferably comprise less than about 75% weight percent of polysiloxane, more preferably less than about 50% by weight percent of polysiloxane based on total weight of the polyurea-based polymer. Polyurea-based polymers that are essentially free of segments derived from polysiloxane polyamines are most preferred.

Polyoxyalkylene Polyamines

The polyoxyalkylene polyamine may be, for example, a polyoxyethylene polyamine, polyoxypropylene polyamine, polyoxytetramethylene polyamine, or mixtures thereof. Polyoxyethylene polyamine may be especially useful when preparing the adhesive for medical applications, for example, where high vapor transfer medium may be desirable. Polyoxyethylene polyamine may also be especially useful when preparing the adhesive for medical applications, for example, where water absorbency may be desirable.

Many polyoxyalkylene polyamines are commercially available. For example, polyoxyalkylene diamines are available under trade designations such as D230, D-400, D-2000, D-4000, DU-700, ED-2001 and EDR-148 (available from Huntsman Chemical; Houston, Tex. under the family trade designation JEFFAMINE).

Polyoxyalkylene triamines are available under trade designations such as T-3000 and T-5000 (available from Huntsman Chemical; Houston, Tex.).

Alkylene Polyamines

Any suitable alkylene polyamine can be used in the present invention. Such alkylene polyamines include, for example, ethylene diamine; diethylene triamine; triethylene tetramine; propylene diamine; butylene diamine; hexamethylene diamine; cyclohexylene diamine; piperazine; 2-methyl piperazine; phenylene diamine; tolylene diamine; xylylene diamine; tris(2-aminoethyl) amine; 3,3'-dinitrobenzidine; 4,4'-methylenebis(2-chloroaniline); 3,3'-dichloro-4,4'-biphenyl diamine; 2,6-diaminopyridine; 4,4'-diaminodiphenylmethane; menthane diamine; m-xylene diamine; isophorone diamine; and dipiperidyl propane. Many alkylene polyamines are also commercially available. For example, alkylene diamines are available under trade designations such as DYTEK A and DYTEK EP (available from DuPont Chemical; Wilmington, Del.).

Polysiloxane Polyamines

Any suitable polysiloxane polyamine may also be used to prepare the polyurea-based polymers of the invention. The polysiloxane polyamine component may provide a means of adjusting the shear strength/tensile modulus of the resultant polymer. In general, high molecular weight polysiloxane polyamines (e.g., those having a weight average molecular weight of greater than about 10,000) provide polymers of lower modulus, whereas low molecular weight polysiloxane polyamines (e.g., those having a weight average molecular weight of less than about 10,000) provide polymers of higher modulus.

If used, preferably the polysiloxane polyamine is a polydiorganosiloxane diamine. Polydiorganosiloxane diamines are available from, for example, Shin-Etsu Silicones of America, Inc.; Torrance, Calif., and H üls America, Piscataway, N.J. They may also be prepared as described in U.S. Pat. No. 5,214,119 (Leir et al.).

Preparation of the Polyurea-Based Polymer

The compositions and constructions of the present invention can be made by solvent processes, solventless processes (e.g., continuous solventless processes, such as reactive extrusion or polymerization on a surface or in a mold) or by a combination of these methods.

Some of the processes suitable for the preparation of the polyurea-based polymers include reacting at least one polyamine and at least one polyisocyanate in a reactor to form the polyurea-based polymer. The polyurea-based polymer can then be removed from the reaction vessel. Alternatively, the polymerization can be carried out by continuously mixing the reactants and depositing the reactants on a surface (e.g., release liner or substrate) or into a mold and polymerizing the mixture in place.

Properties of the compositions of the present invention result from the molecular weight, architecture, and chemical composition of the polyurea-based polymer. For example, one skilled in the art can expect the optimum material for a particular application to be a function of the isocyanate-to-amine ratio, polyisocyanate and polyamine architecture, order of reactant addition, mixing mechanism, mixing speed, reactor temperature, reactor configuration and size, and the presence of any fillers, additives, or property modifiers added, as well as other factors. Furthermore, if solventless processing is used, reactor throughput, residence time, and residence time distribution can affect the molecular weight and architecture of the resulting polyurea-based polymers produced. These variables allow those of skill in the art to vary the molecular weight, architecture, and chemical composition of the resulting polyurea-based polymers over quite a wide range, thus enabling one to tailor the properties to suit a variety of applications.

Any reactor that can provide intimate mixing of the polyamine and polyisocyanate reactants and the reaction product thereof is suitable for use in the invention. The reaction may be carried out, for example, as a batch process using, for example, a flask equipped with a mechanical or magnetic stirrer. Alternatively, the reaction may be carried out in a continuous process.

The reactants can be added simultaneously or sequentially into the reactor and in any sequential order. For example, polyisocyanate can be the first component added into the reactor. Polyamine can then be added downstream in the reactor. Alternately, the polyisocyanate can be added after the polyamine has been introduced into the reactor.

Similarly, the various additives can be added in any order, provided the addition of an additive does not substantially interfere with (i.e., preventing any) reaction of the reactants. For example, an additive that is reactive with a polyisocyanate reactant would typically not be added to the reactor until after the reaction of the polyisocyanate with the polyamine if the additive would prevent reaction of the polyisocyanate with the polyamine.

In general, the isocyanate to amine ratio is preferably about 0.9 to about 1.1, most typically about 1.0. If the isocyanate to amine ratio is outside this preferred range, chemical crosslinking of the composition may be necessary to obtain desired adhesive, particularly PSA, properties.

The polyisocyanate and polyamine components may be selected such that the polyurea-based polymers are inherently tacky. That is, the polyurea-based polymers may have PSA properties without the necessity of adding a tackifier resin to the composition. Tackifier resins often contain a variety of impurities, which may be of low molecular weight. Thus, reduction or elimination of their use may be advantageous in certain applications. For example, in medical and electronic applications, where traces of low molecular weight compounds may be problematic, inherently tacky polyurea-based polymers may be preferred.

To make inherently tacky polyurea-based polymers, reactants (e.g., polyamine and polyisocyanate components) are selected such that the polyurea-based polymer has a tensile modulus of less than the Dahlquist criterion, which is on the order of $10^5$ Pascal. Although such polyurea-based polymers are inherently tacky, a tackifier resin may optionally be added to the composition if desired, for example, to modify the PSA properties (e.g., increase peel adhesion and tack of the PSA) in a desired manner.

Tackifiers

Any suitable tackifier may be used to make adhesive compositions of the invention. The necessity for and amount of tackifier is generally determined based on whether the polyurea-based polymers are inherently tacky and what adhesive properties (i.e., PSA or heat-activatable adhesive) are desired. If the polyurea-based polymers are inherently tacky, a tackifier may not be necessary to obtain adhesive compositions of the invention.

Generally, if used, the tackifier should be compatible with the polyurea-based polymer, preferably at least one of the segments of the polymer that is polymeric or oligomeric. "Compatible" tackifiers are those that, during mixing of the tackifier with the polyurea-based polymer, form a substantially homogenous mixture, as evidenced by a lack of macroscopic phase separation of the tackifier from the polyurea-based polymer visible to the unaided human eye.

A wide variety of tackifier chemistries are known to those of skill in the art. For example, the tackifier chemistry may be based on non-silicates (e.g., terpene phenolics), silicates, and the like. Terpene phenolic-based tackifiers are commercially available from Arizona Chemical; Panama City, Fla., under the trade designation NIREZ. Silicate-based tackifiers are commercially available from GE Silicones; Waterford, N.Y., under the trade designation MQ.

When used, tackifiers are added in amounts sufficient to attain the desired adhesive properties. For example, tackifiers may be used to render the polyurea-based polymer pressure-sensitive. To make a PSA, typically, the amount of tackifier used is about 80 parts per hundred or less, based on weight of the polyurea-based polymer. More preferably, the amount of tackifier used is about 65 parts per hundred or less, even more preferably about 45 parts per hundred or less, based on weight of the polyurea-based polymer. If higher amounts of tackifier are used with certain polyurea-based polymers, PSA properties may be difficult to obtain at room temperature. Also, if tackifiers are used in lower amounts with certain polyurea-based polymers, PSA properties may be difficult to obtain at room temperature. Such compositions may need to be heated to adhere the compositions to a surface. In other words, these compositions may be heat-activatable adhesives.

Additives

The composition of the present invention may also optionally contain various fillers and other property modifiers. Fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 50 parts per hundred parts of the polyurea-based polymer, provided that if and when incorporated, such additives are not detrimental to the properties desired in the final composition. Other additives such as dyes, inert fluids (e.g., hydrocarbon oils), plasticizers, pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition.

Furthermore, the polyurea-based adhesive composition may be further physically crosslinked. For example, acid-containing polymeric materials may be added to the composition for physical interaction with the urea linkages of the polyurea-based polymer. Generally, only minor amounts (e.g., less than about 20, or even as low as one, part per hundred or less based on one hundred parts of the polyurea-based polymer) may provide enhanced physical crosslinking of the adhesive composition. These polymeric materials may significantly increase the shear strength of the adhesive without deleteriously affecting the peel adhesion of the adhesive. Examples of suitable acid-containing polymeric materials include: copolymers of isooctyl acrylate/acrylic acid, and other copolymers described in PCT Publication No. WO 98/13,135.

Application of the Polyurea-Based Polymer

The adhesive is readily applied to a substrate. For example, the adhesive can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., polypropylene (e.g., biaxially oriented polypropylene (BOPP)), polyethylene, polyurea, or polyester (e.g., polyethylene terephthalate)), or release liner (e.g., siliconized liner).

Thus, adhesives according to the present invention can be utilized to form tape, for example. To form a tape, the adhesive is coated onto at least a portion of a suitable backing. A release material (e.g., low adhesion backsize) can be applied to the opposite side of the backing, if desired. When double-sided tapes are formed, the adhesive is coated onto at least a portion of both sides of the backing.

Adhesives of the invention can be applied to a substrate using methods well known to one of ordinary skill in the art. For example, the polyamine and polyisocyanate components can be reacted and applied using melt extrusion techniques to form the adhesive.

The adhesive can be formed into a film or coating by either continuous or batch processes. An example of a batch process is the placement of a portion of the adhesive between a substrate to which the film or coating is to be adhered and a surface capable of releasing the adhesive film or coating to form a composite structure. The composite structure can then be compressed at a sufficient temperature and pressure to form a adhesive coating or film of a desired thickness after cooling. Alternatively, the adhesive can be compressed between two release surfaces and cooled to form an adhesive transfer tape useful in laminating applications.

Continuous forming methods include drawing the adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Adhesives can also be coated using a solvent-based method. For example, the adhesive can be coated by such methods as knife coating, roll coating, gravure coating, rod coating, curtain coating, and air knife coating. The coated solvent-based adhesive is then dried to remove the solvent. Preferably, the coated solvent-based adhesive is subjected to elevated temperatures, such as those supplied by an oven, to expedite drying of the adhesive.

EXAMPLES

These examples are merely for illustrative purposes only and are not meant to be limiting on the scope of the appended claims. All parts, percentages, ratios, etc. in the examples and the rest of the specification are by weight unless indicated otherwise.

Test Methods

The following test methods were used to characterize polyurea-segmented copolymer based compositions produced in the following examples.

180° Peel Adhesion

This peel adhesion test is similar to the test method described in ASTM D 3330-90, substituting a glass substrate for the stainless steel substrate described in the test (for the present purpose, also referred to as "glass substrate peel adhesion test"). If the composition being tested was a heat-activatable adhesive, ASTM D 3330-90 was also modified by adding a step of using sufficient heat to bond the heat-activatable adhesive composition to the glass substrate at the desired peel adhesion value.

Polyurea-based adhesive coatings on polyester film were cut into 1.27 centimeter by 15 centimeter strips. Each strip was then adhered to a 10 centimeter by 20 centimeter clean, solvent washed glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value is an average of the peel adhesion value from each of the two samples.

Shear Strength

This shear strength test is similar to the test method described in ASTM D 3654-88.

Polyurea-based adhesive coatings on polyester film were cut into 1.27 centimeter (0.5 inch) by 15 centimeter (6 inch) strips. Each strip was then adhered to a stainless steel panel such that a 1.27 centimeter by 1.27 centimeter portion of each strip was in firm contact with the panel and one end portion of the tape being free. The panel with coated strip attached was held in a rack such that the panel formed an angle of 178° with the extended tape free end which was tensioned by application of a force of one kilogram applied as a hanging weight from the free end of the coated strip. The 2° less than 180° was used to negate any peel forces, thus ensuring that only shear strength forces were measured, in an attempt to more accurately determine the holding power of the tape being tested. The time elapsed for each tape example to separate from the test panel was recorded as the shear strength. All shear strength failures (if the adhesive failed at less than 10,000 minutes) reported herein were cohesive failures of the adhesive. Each test was terminated at 10,000 minutes, unless the adhesive failed at an earlier time (as noted).

Table of Abbreviations

| Trade Designation or Other Abbreviation | Description |
|---|---|
| JEFFAMINE DU700 | a urea condensate of a polyoxypropylenediamine of approximately 700 molecular weight, commercially available from Huntsman; Houston, TX |
| TMXDI | tetramethyl-m-xylene diisocyanate, commercially available from Cytec Industries; West Patterson, NJ |
| DYTEK A | an organic diamine, commercially available from DuPont; Wilmington, DE |
| DESMODUR W H12MDI (also referred to as "H-MDI") | Methylenedicyclohexylene-4,4'-diisocyanate, commercially available from Bayer; Pittsburgb, PA |
| JEFFAMINE D400 | Polyoxypropylenediamine of approximately 400 molecular weight, commercially available from Huntsman; Houston, TX |
| JEFFAMINE D2000 | a polyoxypropylenediamine of approximately 2,000 molecular weight, commercially available from Huntsman; Houston, TX |
| JEFFAMINE ED2001 | Polyoxyalkyleneamine of approximately 2,000 molecular weight, commercially available from Huntsman; Houston, TX |
| NIREZ 2019 | a terpene phenolic tackifier resin, commercially available from Arizona Chemical; Panama City, FL |
| PET | an aminated-polybutadiene primed polyester film of polyethylene terephthalate having a thickness of 38 micrometers |
| SP 553 | a terpene phenolic tackifier resin, commercially available from Schenectady International, Inc.; Schenectady, NY |
| PICAFYN A100 | a terpene phenolic tackifier resin, commercially available from Hercules, Inc.; Wilmington, DE |
| PDMS diamine | an approximately 5,000 molecular weight polydimethylsiloxane diamine prepared as described in Example 2 of U.S. Pat. No. 5,214,119 |
| MQ resin | a 60% solids solution of MQ silicate resin in toluene, commercially available from GE Silicones; Waterford, NY under the trade designation SR545 |
| ACP | An acid-containing polymeric material, specifically an 80/20 isooctyl acrylate/acrylic acid copolymer PSA such as those described in PCT Publication No. WO 99142536 |
| PHR | parts per 100 parts polyurea-based polymer |

Example 1

In a glass reactor equipped with a magnetic stirrer was placed 20.0 grams of JEFFAMINE DU700 and 44.8 grams of 2-propanol to yield a homogenous solution. To this was added, with mixing, 5.20 grams of TMXDI. After one hour of stirring, 0.16 gram of DYTEK A and 0.71 gram of DESMODUR W H12MDI were added to the solution and mixed for one day. The solution viscosity rose during this mixing.

The resulting solution was cast onto PET and dried at 70° C. for 10 minutes to yield a 25 micrometer-thick coating. The peel adhesion and shear strength values for this adhesive are recorded in Table 1.

Example 2

In a glass reactor equipped with a magnetic stirrer was mixed 12.0 grams of JEFFAMINE D400, 55.6 grams of 2-propanol, and 8.0 grams of JEFFAMINE D2000, to yield a homogenous solution. To this was added, with mixing, 8.02 grams of TMXDI. After one hour of stirring, 0.01 gram of DYTEK A and 0.05 gram of DESMODUR W H 12MDI were added to the solution and mixed for one day. The solution viscosity rose during this mixing.

The resulting solution was cast onto PET and dried at 70° C. for 10 minutes to yield a 25 micrometer-thick coating. The peel adhesion and shear strength values for this adhesive are recorded in Table 1.

Example 3

In a glass reactor equipped with a magnetic stirrer was placed 20.0 grams of JEFFAMINE DU700 and 45.0 grams of 2-propanol to yield a homogenous solution. To this was added, with mixing, 5.01 grams of TMXDI. After one hour of stirring 0.46 gram of DESMODUR W H12MDI was added to the solution and mixed for one day. The solution viscosity rose during this mixing.

The resulting solution was cast onto PET and dried at 70° C. for 10 minutes to yield a 25 micrometer-thick coating. The peel adhesion and shear strength values for this adhesive are recorded in Table 1.

TABLE 1

| Example | Peel Adhesion (N/dm) | Shear Strength (minutes) |
|---|---|---|
| 1 | 3.4 | 290 |
| 2 | 15.1 | 10,000 |
| 3 | 23.5 | 54 |

Example 4

In a glass reactor equipped with a magnetic stirrer was mixed 40.0 grams of JEFFAMINE ED2001, 1.47 grams of DYTEK A and 116.7 grams of 2-propanol to yield a homogenous solution. To this solution was added 8.53 grams of DESMODUR W H12MDI and the resulting mixture was mixed for one day. The solution viscosity rose during this mixing.

A tackifier solution of 20.0 grams of NIREZ 2019 in 46.6 grams of toluene was added to the polymer solution. The resulting solution was cast onto PET and dried at 70° C. for 10 minutes to yield a 25 micrometer-thick coating. The peel adhesion, shear strength, and tackifier level values for this adhesive are recorded in Table 2.

Example 5

In a glass reactor equipped with a magnetic stirrer was placed 40.0 grams of JEFFAMINE D2000 and 116.7 grams of 2-propanol to yield a homogenous solution. To this solution was added 1.44 grams of DYTEK A and 8.56 grams of DESMODUR W H12MDI and the resulting mixture was mixed for one day. The solution viscosity rose during this mixing.

A tackifier solution of 15.0 grams of NIREZ 2019 in 35.0 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 6

In a glass reactor equipped with a magnetic stirrer was placed 42.5 grams of JEFFAMINE D2000 and 116.0 grams of 2-propanol to yield a homogenous solution. To this solution was added 0.57 gram of DYTEK A and 6.94 grams of DESMODUR W H12MDI and the resulting mixture was mixed for one day. The solution viscosity rose during this mixing.

A tackifier solution of 20.0 grams of NIREZ 2019 in 46.6 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 7

In a glass reactor equipped with a magnetic stirrer was placed 20.0 grams of JEFFAMINE D2000 and 60.2 grams of 2-propanol to yield a homogenous solution. To this solution was added, with mixing, 1.18 grams of TMXDI. After one hour of stirring, 0.99 gram of DYTEK A and 3.64 grams of DESMODUR W H12MDI were added, and the resulting mixture was mixed for one day. The solution viscosity rose during this mixing.

A tackifier solution of 7.75 grams of NIREZ 2019 in 18.07 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 8

In a glass reactor equipped with a magnetic stirrer was placed 20.0 grams of JEFFAMINE D2000 and 62.8 grams of 2-propanol to yield a homogenous solution. To this solution was added, with mixing, 1.57 grams of TMXDI. After one hour of stirring, 1.36 grams of DYTEK A and 4.03 grams of DESMODUR W H12MDI were added, and the resulting mixture was mixed for one day. The solution viscosity rose during this mixing.

A tackifier solution of 10.78 grams of NIREZ 2019 in 25.16 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 9

In a glass reactor equipped with a magnetic stirrer was placed 20.0 grams of JEFFAMINE ED2001 and 62.0 grams of 2-propanol to yield a homogenous solution. To this solution was added, with mixing, 1.05 grams of TMXDI. After one hour of stirring, 1.19 grams of DYTEK A and 4.07 grams of DESMODUR W H 12MDI were added, and the resulting mixture was mixed for one day. The solution viscosity rose during this mixing.

A tackifier solution of 10.5 grams of NIREZ 2019 in 24.5 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 10

In a glass reactor equipped with a magnetic stirrer was mixed 149.6 grams of JEFFAMINE D2000, 26.4 grams of JEFFAMINE ED2001, 0.54 gram of DYTEK A and 467.0 grams of 2-propanol, to yield a homogenous solution. To this was added, with mixing, 23.46 grams of DESMODUR W H12MDI and the resulting mixture was mixed for one day. The solution viscosity rose during this mixing.

A tackifier solution of 160.0 grams of NIREZ 2019 in 374.0 grams of toluene was added to the polymer solution. The resulting solution was cast onto PET and dried at 70° C. for 10 minutes to yield a 25 micrometer-thick coating. The peel adhesion and tackifier level values for this adhesive are recorded in Table 2.

Example 11

In a glass reactor equipped with a magnetic stirrer was mixed 25.0 grams of PDMS diamine, 25.0 grams of JEFFAMINE ED2001, and 126.0 grams of 2-propanol, to yield a homogenous solution. To this was added, with mixing, 4.02 grams of DESMODUR W H 12MDI and the resulting mixture was mixed for one day. The solution viscosity rose during this mixing.

A tackifier solution of 27.01 grams of MQ resin in 15.7 grams of toluene was added to the polymer solution. The resulting solution was cast onto PET and dried at 70° C. for 10 minutes to yield a 25 micrometer-thick coating. The peel adhesion and tackifier level value for this adhesive is recorded in Table 2 (the failure mode was a cohesive split).

Example 12

In a glass reactor equipped with a magnetic stirrer was placed 20.0 grams of JEFFAMINE ED2001 and 62.0 grams of 2-propanol to yield a homogenous solution. To this solution was added, with mixing, 1.56 grams of TMXDI. After one hour of stirring, 1.44 grams of DYTEK A and 3.95 grams of DESMODUR W H12MDI were added, and the resulting mixture was mixed for one day. The solution viscosity rose during this mixing.

A tackifier solution of 13.5 grams of NIREZ 2019 in 31.5 grams of toluene was added to the polymer solution. The resulting solution was cast onto PET and dried at 70° C. for 10 minutes to yield a 25 micrometer-thick coating. The peel adhesion and shear strength values for this adhesive are recorded in Table 2.

Example 13

In a glass reactor equipped with a magnetic stirrer was placed 40.5 grams of JEFFAMINE D2000 and 116.0 grams of 2-propanol to yield a homogenous solution. To this solution was added 1.26 grams of DYTEK A and 8.23 grams of DESMODUR W H12MDI and the resulting mixture was mixed for one day. The solution viscosity rose during this mixing.

A tackifier solution of 30.0 grams of NIREZ 2019 in 70.0 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 14

In a glass reactor equipped with a magnetic stirrer was placed 20.0 grams of JEFFAMINE D2000 and 63.0 grams of 2-propanol to yield a homogenous solution. To this solution was added, with mixing, 1.18 grams of TMXDI. After one hour of stirring, 1.20 grams of DYTEK A and 4.08 grams of DESMODUR W H 12MDI were added, and the resulting mixture was mixed for one day. The solution viscosity rose during this mixing.

A tackifier solution of 13.23 grams of NIREZ 2019 in 30.90 grams of toluene was added to the polymer solution. The resulting solution was cast onto PET and dried at 70° C. for 10 minutes to yield a 25.4 micrometer-thick coating. The peel adhesion, shear strength and tackifier level values for this adhesive are recorded in Table 2.

Example 15

In a glass reactor equipped with a magnetic stirrer was mixed 158.4 grams of JEFFAMINE D2000, 17.6 grams of JEFFAMINE ED2001, 0.50 gram of DYTEK A and 467.0 grams of 2-propanol, to yield a homogenous solution. To this was added, with mixing, 23.50 grams of DESMODUR W H12MDI and the resulting mixture was mixed for one day. The solution viscosity rose during this mixing.

A tackifier solution of 140.0 grams of NIREZ 2019 in 327.0 grams of toluene was added to the polymer solution The resulting solution was cast onto PET and dried at 70° C. for 10 minutes to yield a 25 micrometer-thick coating. The peel adhesion, shear strength and tackifier level values for this adhesive are recorded in Table 2.

Example 16

In a glass reactor equipped with a magnetic stirrer was mixed 140.8 grams of JEFFAMINE D2000, 35.2 grams of JEFFAMINE ED2001, 0.58 gram of DYTEK A and 467.0 grams of 2-propanol, to yield a homogenous solution. To this was added, with mixing, 23.42 grams of DESMODUR W H12MDI and the resulting mixture was mixed for one day. The solution viscosity rose during this mixing.

A tackifier solution of 160.0 grams of NIREZ 2019 in 374.0 grams of toluene was added to the polymer solution. The resulting solution was cast onto PET and dried at 70° C. for 10 minutes to yield a 25 micrometer-thick coating. The peel adhesion and tackifier level values for this adhesive are recorded in Table 2.

Example 17

In a glass reactor equipped with a magnetic stirrer was mixed 5.5 grams of JEFFAMINE D2000, 16.5 grams of JEFFAMINE ED2001, 0.14 gram of DYTEK A and 59.0 grams of 2-propanol, to yield a homogenous solution. To this was added, with mixing, 2.86 grams of DESMODUR W H12MDI and the resulting mixture was mixed for one day. The solution viscosity rose during this mixing.

A tackifier solution of 17.5 grams of NIREZ 2019 in 40.8 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 18

In a glass reactor equipped with a magnetic stirrer was placed 44.00 grams of JEFFAMINE D2000 and 116.0 grams of 2-propanol to yield a homogenous solution. To this solution was added 6.00 grams of DESMODUR W H12MDI and the resulting mixture was mixed for one day. The solution viscosity rose during this mixing. A tackifier solution of 10.0 grams of PICAFYN A100, in 23.3 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 19

In a glass reactor equipped with a magnetic stirrer was placed 44.00 grams of JEFFAMINE D2000 and 116.0 grams of 2-propanol to yield a homogenous solution. To this solution was added 6.00 grams of DESMODUR W H12MDI and the resulting mixture was mixed for one day. The solution viscosity rose during this mixing.

A tackifier solution of 30.0 grams of SP 553 in 70.0 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 2.

Example 20

JEFFAMINE D2000 was fed into Zone 1 of a 25-millimeter diameter co-rotating twin screw extruder (available from Berstorff Corporation; Charlotte, N.C.) at a rate of 66.59 grams/minute and DESMODUR W H12MDI was fed into zone 2 at a rate of 9.05 grams/minute. The temperature profile for the extruder was: Zone 1— 20° C.; Zone 2—75° C.; Zone 3—100° C.; Zone 4—125° C.; Zones 5 and 6—150° C.; and the end cap and melt pump temperatures were also 150° C. The screw rotation rate was 200 revolutions per minute.

A total of 1.35 kilograms of polymer was collected from the extruder and cooled. A 20.0 gram sample of this polymer was then dissolved in 66.7 grams of 2-propanol. A tackifier solution of 8.00 grams of NIREZ 2019 in 26.7 grams of toluene was added to the polymer solution.

After one day of mixing, this solution was cast onto PET and dried at 70° C. for 10 minutes to yield a 25 micrometer-thick coating. The peel adhesion, shear strength and tackifier level values for this adhesive are recorded in Table 2.

TABLE 2

| Example | Tackifier Levd (PHR) | Peel Adhesion (N/dm) | Shear Strength (minutes) |
|---|---|---|---|
| 4 | 40 | 70.5 | 71 |
| 5 | 30 | 2.2 | 7,543 |
| 6 | 40 | 61.3 | 68 |
| 7 | 30 | 40.3 | 10,000 |
| 8 | 40 | 62.4 | 5,721 |
| 9 | 40 | 71.7 | 10,000 |
| 10 | 80 | 45.1 | * |
| 11 | 50 | 29.5 | * |
| 12 | 50 | 76.9 | 10,000 |
| 13 | 60 | 20.8 | 2,367 |
| 14 | 50 | 20.6 | 10,000 |
| 15 | 70 | 69.1 | 13 |
| 16 | 80 | 45.1 | * |
| 17 | 70 | 28.3 | 31 |
| 18 | 20 | 26.8 | 10 |
| 19 | 60 | 75.6 | 12 |
| 20 | 40 | 17.5 | 15 |

* = Not Tested

Example 21

The same polymer solution synthesis of Example 5 was repeated, except the amount of tackifier was doubled. In a glass reactor equipped with a magnetic stirrer was placed 40.0 grams of JEFFAMINE D2000 and 116.0 grams of 2-propanol to yield a homogenous solution. To this solution was added 1.44 grams of DYTEK A and 8.56 grams of DESMODUR W H12MDI and the resulting mixture was mixed for one day. The solution viscosity rose during this mixing.

A tackifier solution of 30.0 grams of NIREZ 2019 in 70.0 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

Example 22

The same polymer solution synthesis of Example 7 was repeated, except the amount of tackifier was doubled. In a glass reactor equipped with a magnetic stirrer was placed 20.0 grams of JEFFAMINE D2000 and 60.2 grams of 2-propanol to yield a homogenous solution. To this solution was added, with mixing, 1.18 grams of TMXDI. After one hour of stirring, 0.99 gram of DYTEK A and 3.64 grams of DESMODUR W H12MDI were added, and the resulting mixture was mixed for one day. The solution viscosity rose during this mixing.

A tackifier solution of 15.48 grams of NIREZ 2019 in 36.1 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

Example 23

The same polymer solution synthesis of Example 22 was repeated, except a lower level of tackifier was used. In a glass reactor equipped with a magnetic stirrer was placed 20.0 grams of JEFFAMINE D2000 and 60.2 grams of 2-propanol to yield a homogenous solution. To this solution was added, with mixing, 1.18 grams of TMXDI. After one hour of stirring, 0.99 gram of DYTEK A and 3.64 grams of DESMODUR W H12MDI were added, and the resulting mixture was mixed for one day. The solution viscosity rose during this mixing.

A tackifier solution of 12.91 grams of NIREZ 2019 in 30.10 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

Example 24

The same polymer solution synthesis of Example 8 was repeated, except a higher level of tackifier was used. In a glass reactor equipped with a magnetic stirrer was placed 20.0 grams of JEFFAMINE D2000 and 63.0 grams of 2-propanol to yield a homogenous solution. To this solution was added, with mixing, 1.57 grams of TMXDI. After one hour of stirring, 1.36 grams of DYTEK A and 4.03 grams of DESMODUR W H12MDI were added, and the resulting mixture was mixed for one day. The solution viscosity rose during this mixing.

A tackifier solution of 16.18 grams of NIREZ 2019 in 37.7 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

Example 25

The same polymer solution synthesis of Example 11 was repeated, except a higher level of tackifier was used. In a glass reactor equipped with a magnetic stirrer was mixed 149.6 grams of JEFFAMINE D2000, 26.4 grams of JEFFAMINE ED2001, 0.54 gram of DYTEK A and 467.0 grams of 2-propanol, to yield a homogenous solution. To this was added, with mixing, 23.46 grams of DESMODUR W H12MDI and the resulting mixture was mixed for one day. The solution viscosity rose during this mixing.

A tackifier solution of 140.0 grams of NIREZ 2019 in 327.0 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

Example 26

The same polymer solution synthesis of Example 14 was repeated, except a higher level of tackifier was used. In a glass reactor equipped with a magnetic stirrer was placed 20.0 grams of JEFFAMINE D2000 and 63.0 grams of 2-propanol to yield a homogenous solution. To this solution was added, with mixing, 1.18 grams of TMXDI. After one hour of stirring, 1.20 grams of DYTEK A and 4.08 grams of DESMODUR W H12MDI were added, and the resulting mixture was mixed for one day. The solution viscosity rose during this mixing.

A tackifier solution of 15.88 grams of NIREZ 2019 in 37.10 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

Example 27

The same polymer solution synthesis of Example 14 was repeated, except a lower level of tackifier was used In a glass reactor equipped with a magnetic stirrer was placed 20.0 grams of JEFFAMINE D2000 and 62.0 grams of 2-propanol to yield a homogenous solution. To this solution was added, with mixing, 1.18 grams of TMXDI. After one hour of stirring, 1.20 grams of DYTEK A and 4.08 grams of DESMODUR W H12MDI were added, and the resulting mixture was mixed for one day. The solution viscosity rose during this mixing.

A tackifier solution of 10.58 grams of NIREZ 2019 in 24.7 grams of toluene was added to the polymer solution. The resulting solution was cast onto PET and dried at 70° C. for 10 minutes to yield a 25 micrometer-thick coating. The peel adhesion, shear strength and tackifier level values for this adhesive are recorded in Table 3.

TABLE 3

| Example | Tackifier Levd (PHR) | Peel Adhesion (N/dm) | Shear Strength (minutes) |
|---|---|---|---|
| 21 | 60 | 0.1 | 10,000 |
| 22 | 60 | 31.7 | 10,000 |
| 23 | 50 | 38.5 | 10,000 |
| 24 | 60 | 36.1 | 10,000 |
| 25 | 70 | 62.0 | 10 |
| 26 | 60 | 12.3 | 10,000 |
| 27 | 40 | 49.4 | 10,000 |

Example 28

In a glass reactor equipped with a magnetic stirrer was placed 44.0 grams of JEFFAMINE D2000 and 116.0 grams of 2-propanol to yield a homogenous solution.

To this solution was added 6.00 grams of DESMODUR W H 12MDI and the resulting mixture was mixed for one day. The solution viscosity rose during this mixing.

A tackifier solution of 20.0 grams of NIREZ 2019 in 46.7 grams of toluene was added to the polymer solution. The resulting solution was cast onto PET and dried at 70° C. for 10 minutes to yield a 25 micrometer-thick coating. The peel adhesion, shear strength, tackifier level, and crosslinker level values for this adhesive are recorded in Table 4.

Example 29

In a glass reactor equipped with a magnetic stirrer was placed 20.0 grams of JEFFAMINE D2000 and 56.0 grams of 2-propanol to yield a homogenous solution. To this solution was added, with mixing, 1.18 grams of TMXDI. After one hour of stirring, 0.46 gram of DYTEK A and 2.43 grams of DESMODUR W H12MDI were added, and the resulting mixture was mixed for one day. The solution viscosity rose during this mixing.

A tackifier solution of 9.63 grams of NIREZ 2019 in 22.50 grams of toluene was added to the polymer solution. The resulting solution was cast onto PET and dried at 70° C. for 10 minutes to yield a 25 micrometer-thick coating. The peel adhesion, shear strength, tackifier level, and crosslinker level values for this adhesive are recorded in Table 4.

Example 30

In a glass reactor equipped with a magnetic stirrer was placed 20.0 grams of JEFFAMINE D2000 and 58.0 grams of 2-propanol to yield a homogenous solution. To this solution was added, with mixing, 2.07 grams of TMXDI. After one hour of stirring, 0.78 gram of DYTEK A and 2.11 grams of DESMODUR W H12MDI were added, and the resulting mixture was mixed for one day. The solution viscosity rose during this mixing.

A tackifier solution of 9.96 grams of NIREZ 2019 in 23.30 grams of toluene was added to the polymer solution. The resulting solution was cast onto PET and dried at 70° C. for 10 minutes to yield a 25 micrometer-thick coating. The peel adhesion, shear strength, tackifier level, and crosslinker level values for this adhesive are recorded in Table 4.

Example 31

To the tackified PSA solution of Example 28, was added 0.50 grams of ACP dissolved in 1.16 grams of ethyl acetate.

After one day of mixing, this solution was cast onto PET and dried at 70° C. for 10 minutes to yield a 25 micrometer-thick coating. The peel adhesion, shear strength, tackifier level, and crosslinker level values for this adhesive are recorded in Table 4.

Example 32

To the tackified PSA solution of Example 28, was added 2.50 grams of ACP dissolved in 5.83 grams of ethyl acetate. After one day of mixing, this solution was cast onto PET and dried at 70° C. for 10 minutes to yield a 25 micrometer-thick coating. The peel adhesion, shear strength, tackifier level, and crosslinker level values for this adhesive are recorded in Table 4.

Example 33

To the tackified PSA solution of Example 28, was added 5.00 grams of ACP dissolved in 11.67 grams of ethyl acetate. After one day of mixing, this solution was cast onto PET and dried at 70° C. for 10 minutes to yield a 25 micrometer-thick coating. The peel adhesion, shear strength, tackifier level, and crosslinker level values for this adhesive are recorded in Table 4.

Example 34

To the tackified PSA solution of Example 29, was added 1.20 grams of ACP dissolved in 2.81 grams of ethyl acetate. After one day of mixing, this solution was cast onto PET and dried at 70° C. for 10 minutes to yield a 25 micrometer-thick coating. The peel adhesion, shear strength, tackifier level, and crosslinker level values for this adhesive are recorded in Table 4.

Example 35

To the tackified PSA solution of Example 30, was added 1.25 grams of ACP dissolved in 2.90 grams of ethyl acetate. After one day of mixing, this solution was cast onto PET and dried at 70° C. for 10 minutes to yield a 25 micrometer-thick coating. The peel adhesion, shear strength, tackifier level, and crosslinker level values for this adhesive are recorded in Table 4.

TABLE 4

| Example | Tackifier Level (PHR) | Crosslinker Level (PHR) | Peel Adhesion (N/dm) | Shear Strength (minutes) |
| --- | --- | --- | --- | --- |
| 28 | 40 | — | 108.4 | 3 |
| 29 | 40 | — | 72.6 | 284 |
| 30 | 40 | — | 63.5 | 9 |
| 31 | 40 | 1 | 158.8 | 5 |
| 32 | 40 | 5 | 56.9 | 10,000 |
| 33 | 40 | 10 | 77.2 | 10,000 |
| 34 | 40 | 5 | 60.2 | 2320 |
| 35 | 40 | 5 | 44.2 | 200 |

Example 36

The same adhesive formulation prepared in Example 5 was coated onto PET, and applied to a glass plate with eight passes of a 2-kilogram roller and allowed to dwell at 120° C. for 30 minutes without the application of additional pressure. The samples were allowed to cool in a controlled temperature (22° C.) and humidity (50% relative humidity) environment for 30 minutes to allow the samples to reach ambient temperature. The peel adhesion and tackifier level values for this adhesive, which is a heat-activatable adhesive, are shown in Table 5 along with those of Example 5 for comparison.

Example 37

The same adhesive formulation prepared in Example 21 was coated onto PET, and applied to a glass plate with eight passes of a 2-kilogram roller and allowed to dwell at 120° C. for 30 minutes without the application of additional pressure. The samples were allowed to cool in a controlled temperature (22° C.) and humidity (50% relative humidity) environment for 30 minutes to allow the samples to reach ambient temperature. The peel adhesion and tackifier level for this adhesive, which is a heat-activatable adhesive, are shown in Table 5 along with those of Example 21 for comparison.

TABLE 5

| Example | Tackifier Level (PHR) | Elevated Temperature (120° C.) Dwell (minutes) | Peel Adhesion (N/dm) |
| --- | --- | --- | --- |
| 5 | 30 | 0 | 2.2 |
| 36 | 30 | 30 | 38.9 |
| 21 | 60 | 0 | 0.1 |
| 37 | 60 | 30 | 66 |

Comparative Examples 1A and 1B

PSA tapes were prepared using the polysiloxane polyurea elastomer described in Example 21 of U.S. Pat. No. 5,461,134, except a mixture of 70 parts toluene and 30 parts 2-propanol (by weight) was used to prepare the elastomer and the elastomer was formulated into a PSA solution with varying levels of MQ resin tackifier. The resulting elastomer was a 1:1 copolymer (on a molar basis) of 21,213 molecular weight silicone diamine and H-MDI. The elastomer was blended with differing levels of MQ resin tackifier using a mixture of 75 parts toluene and 25 parts 2-propanol (by weight) as the solvent system for the PSA solution. The final solids content of the PSA solution was 25%. The peel adhesion and shear strength values for these adhesives are recorded in Comparative Table 1.

Comparative Examples 2A and 2B

PSA tapes was prepared using the polysiloxane polyurea elastomer described in Example 23 of U.S. Pat. No. 5,461,134, except a mixture of 70 parts toluene and 30 parts 2-propanol (by weight) was used to prepare the elastomer and the elastomer was formulated into a PSA solution with varying levels of MQ resin tackifier. The resulting elastomer was a 1:1 copolymer (on a molar basis) of 36,380 molecular weight silicone diamine and H-MDL The elastomer was blended with differing levels of MQ resin tackifier using a mixture of 75 parts toluene and 25 parts 2-propanol (by weight) as the solvent system for the PSA solution. The final solids content of the PSA solution was 20%. The peel adhesion and shear strength values for these adhesives are recorded in Comparative Table 1.

COMPARATIVE TABLE 1

| Comparative Example | Diamine Molecular Weight | MQ resin level (PHR) | Peel Adhesion (N/dm) | Shear Strength (minutes) |
|---|---|---|---|---|
| 1A | 21,200 | 45 | 2.9 | 645 |
| 1B | 21,200 | 100 | 40.3 | 274 |
| 2A | 36,380 | 45 | 7.6 | 897 |
| 2B | 36,380 | 100 | 43.1 | 1,214 |

Various modifications and alterations of the invention will become apparent to those skilled in the art without departing from the spirit and scope of the invention, which is defined by the accompanying claims.

What is claimed is:

1. An adhesive composition comprising
a silicone free polyurea-based polymer, comprising a segmented copolymer, wherein the copolymer comprises repeating units of Formula I:

$$\left\{\left[\begin{matrix}O & & & O \\ \| & & & \| \\ C-N-Z-N-C-N-B-N \\ | & | & | & | \\ H & H & D & D\end{matrix}\right]_a \begin{matrix}O & & & O \\ \| & & & \| \\ C-N-Z-N-C-N-Y-N \\ | & | & | & | \\ H & H & D & D\end{matrix}\right\}_m \quad (I)$$

wherein:
each B is independently a polyvalent radical selected from a group consisting of arylene, aralkylene, cycloalkylene, polyoxyalkylene, or mixtures thereof;
each D is independently selected from the group consisting of hydrogen, an alkyl group, a cycloalkyl group, a phenyl group, a group that completes a ring structure that includes B to form a heterocycle, and mixtures thereof;
each Z is independently a polyvalent radical having about 1 to about 20 carbon atoms;
each Y is independently a polyoxyalkylene;
m is an integer greater than zero; and
a is zero or an integer greater than zero; and
wherein the composition comprises a tackifier in an amount sufficient to provide the adhesive composition as a pressure sensitive adhesive and in an amount less than about 45 parts by weight tackifier per hundred part by weight polyurea-based polymer.

2. The composition of claim 1, wherein B is a polyoxyalkylene.

3. The composition of claim 1, wherein Y is selected from the group consisting of polyethylene oxide, polypropylene oxide, and polytetramethylene oxide.

4. The composition of claim 1, wherein a is an integer greater than zero.

5. The composition of claim 1, wherein the composition exhibits a peel adhesion of greater than about 20.0 N/dm when tested according to ASTM D 3330-90, wherein ASTM D 3330-90 is modified by substituting a glass substrate for a stainless steel substrate.

6. The composition of claim 1, wherein the composition exhibits a shear strength of greater than about one minute when tested according to ASTM D 3654-88.

7. The composition of claim 1, wherein the composition exhibits a shear strength of greater than about 10 minutes when tested according to ASTM D 3654-88.

8. The composition of claim 1, wherein the composition exhibits a shear strength of greater than about 100 minutes when tested according to ASTM D 3654-88.

9. The composition of claim 1, wherein the polyurea-based polymer comprises a segmented copolymer, wherein at least about 0.5 mole fraction of linkages between segments in a backbone of the polymer are urea linkages.

10. The composition of claim 1, wherein the polyurea-based polymer comprises a segmented copolymer, wherein at least about 0.75 mole fraction of linkage between segments in a backbone of the polymer are urea linkages.

11. The composition of claim 1, wherein the polyurea-based polymer comprises a segmented copolymer, wherein at least about 0.95 mole fraction or linkages between segments in a backbone of the polymer are urea linkages.

12. The composition of claim 1, wherein the composition further comprises an acid-containing polymeric material.

13. An adhesive tape comprising:
a backing; and
the adhesive composition of claim 1 coated on at least a portion thereof.

14. The adhesive tape of claim 13, wherein the backing comprises a polyurea.

15. The adhesive tape of claim 13, further comprising a release material coated on at least a portion of the backing, on a side of the backing opposite of the adhesive.

16. A method of preparing the adhesive composition of claim 1, the method comprising the steps of:
providing at least one polyisocyanate;
providing at least one polyamine;
reacting the at least one polyisocyanate with the at least polyamine to form the polyurea-based polymer; and
optionally adding the tackifier to the polyurea-based polymer.

17. The method of claim 16, wherein at least one polyisocyanate and the at least one polyamine are reacted by reactive extrusion.

18. The method of claim 16, further comprising the stop of hot-melt coating the adhesive composition onto a substrate.

19. The method of claim 16, further comprising the step of solvent coating the adhesive composition onto a substrate.

20. The method of claim 16, wherein the polyurea-based polymer is polymerized on-web.

21. The adhesive composition of claim 1, wherein the polyurea-based polymer exhibits a peel adhesion of greater than about 10.0 N/dm when tested according to ASTM D 3330-90, wherein ASTM D 3330-90 is modified by substituting a glass substrate for a stainless steel substrate.

* * * * *

UNITED STATES PATENT AND TRADEMARK OFFICE
CERTIFICATE OF CORRECTION

PATENT NO. : 6,824,820 B1
DATED : November 30, 2004
INVENTOR(S) : Kinning, David J.

It is certified that error appears in the above-identified patent and that said Letters Patent is hereby corrected as shown below:

<u>Title page,</u>
Item [57], ABSTRACT,
Line 2, delete "form" and insert -- from --.

<u>Column 1,</u>
Line 1, after "Linkages" delete "of" and insert -- on --.

<u>Column 3,</u>
Line 52, delete "preexisting" and insert -- pre-existing --.

<u>Column 7,</u>
Line 60, delete "polyoxytetamethylene" and insert -- polyoxytetramethylene --.

<u>Column 14,</u>
Line 29, delete "m-xylene" and insert -- m-xylylene --.
Line 33, delete "Pitisburgh" and insert -- Pitisburgh --.
Line 61, delete "99142536" and insert -- 99/42536 --.

<u>Column 18,</u>
Line 32, after "solution" insert -- . --.

<u>Column 19,</u>
Line 55, delete "levd" and insert -- level --.

<u>Column 20,</u>
Line 4, delete "levd" and insert -- level --.

<u>Column 21,</u>
Line 21, delete "Example 11" and insert -- Example 10 --.
Line 22, delete "higher" and insert -- lower --.
Line 57, after "used" insert -- . --.

UNITED STATES PATENT AND TRADEMARK OFFICE
CERTIFICATE OF CORRECTION

PATENT NO. : 6,824,820 B1
DATED : November 30, 2004
INVENTOR(S) : Kinning, David J.

It is certified that error appears in the above-identified patent and that said Letters Patent is hereby corrected as shown below:

Column 22,
Line 9, delete "levd" and insert -- level --.

Column 23,
Line 53, delete "56.9" and insert -- 86.9 --.

Column 24,
Line 60, delete "H-MDL" and insert -- H-MDI --.

Column 26,
Line 16, delete "linkage" and insert -- linkages --.
Line 20, delete "or" and insert -- of --.
Line 46, delete "stop" and insert -- step --.

Signed and Sealed this

Twentieth Day of December, 2005

JON W. DUDAS
*Director of the United States Patent and Trademark Office*